United States Patent
Reith et al.

(10) Patent No.: US 9,694,320 B2
(45) Date of Patent: Jul. 4, 2017

(54) SCR CATALYTIC CONVERTER HAVING IMPROVED NOX CONVERSION

(71) Applicant: UMICORE AG & CO. KG, Hanau-Wolfgang (DE)

(72) Inventors: Christoph Reith, Motten (DE); Michael Seyler, Rodenbach (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 0 days.

(21) Appl. No.: 14/768,961

(22) PCT Filed: Feb. 21, 2014

(86) PCT No.: PCT/EP2014/053464
§ 371 (c)(1),
(2) Date: Aug. 19, 2015

(87) PCT Pub. No.: WO2014/128270
PCT Pub. Date: Aug. 28, 2014

(65) Prior Publication Data
US 2016/0008761 A1      Jan. 14, 2016

(30) Foreign Application Priority Data
Feb. 25, 2013   (DE) .................. 10 2013 003 112

(51) Int. Cl.
*B01D 53/94* (2006.01)
*F01N 3/24* (2006.01)
(Continued)

(52) U.S. Cl.
CPC ..... *B01D 53/9418* (2013.01); *B01D 53/9477* (2013.01); *B01J 35/0006* (2013.01);
(Continued)

(58) Field of Classification Search
CPC . B01D 53/9409; B01D 53/9418; F01N 3/206; F01N 3/2066
See application file for complete search history.

(56) References Cited

U.S. PATENT DOCUMENTS 5,120,695 A    6/1992  Blumrich et al.
8,568,678 B2   10/2013 Soeger et al.
(Continued)

FOREIGN PATENT DOCUMENTS

DE   10 2007 022 858 A1 * 11/2008 ........... F01N 3/2066
EP         0324082 A1    11/1988
(Continued)

OTHER PUBLICATIONS

International Search Report for PCT/EP2014/053464, dated May 27, 2014 in English & German.
(Continued)

*Primary Examiner* — Timothy Vanoy
(74) *Attorney, Agent, or Firm* — Smith, Gambrell & Russell, LLP

(57) ABSTRACT

The invention relates to the possibility of improving selective catalytic reduction (SCR), which is the selective reaction of nitrogen oxides with ammonia in the exhaust gas of combustion processes on an exhaust-gas catalytic converter suitable therefor—the SCR catalytic converter. For this purpose, materials used in the catalytic converter for storing ammonia are distributed on the catalyst carrier in such a way that, viewed in the flow direction, a region having low ammonia storage capacity is followed by a region of higher ammonia storage capacity.

20 Claims, 3 Drawing Sheets

(51) Int. Cl.

| | | |
|---|---|---|
| *B01J 35/00* | (2006.01) | |
| *F01N 3/20* | (2006.01) | |
| *F01N 3/10* | (2006.01) | |
| *F01N 3/035* | (2006.01) | |
| *B01J 37/02* | (2006.01) | |
| *B01J 29/08* | (2006.01) | |
| *B01J 29/18* | (2006.01) | |
| *B01J 29/40* | (2006.01) | |
| *B01J 29/65* | (2006.01) | |
| *B01J 29/70* | (2006.01) | |
| *B01J 29/83* | (2006.01) | |
| *B01J 29/85* | (2006.01) | |
| *B01J 35/04* | (2006.01) | |

(52) U.S. Cl.
CPC .......... *B01J 37/0246* (2013.01); *F01N 3/035* (2013.01); *F01N 3/103* (2013.01); *F01N 3/106* (2013.01); *F01N 3/2066* (2013.01); *B01D 2251/2062* (2013.01); *B01D 2255/50* (2013.01); *B01D 2255/911* (2013.01); *B01J 29/084* (2013.01); *B01J 29/18* (2013.01); *B01J 29/40* (2013.01); *B01J 29/65* (2013.01); *B01J 29/7007* (2013.01); *B01J 29/7015* (2013.01); *B01J 29/83* (2013.01); *B01J 29/85* (2013.01); *B01J 35/04* (2013.01); *F01N 2510/0682* (2013.01); *F01N 2570/18* (2013.01); *Y02T 10/24* (2013.01)

(56) References Cited

U.S. PATENT DOCUMENTS

| | | | |
|---|---|---|---|
| 8,753,596 | B2 | 6/2014 | Spurk et al. |
| 2004/0254072 | A1 | 12/2004 | Yan et al. |
| 2006/0010857 | A1 | 1/2006 | Hu et al. |
| 2008/0008629 | A1 | 1/2008 | Doring et al. |
| 2008/0041040 | A1 | 2/2008 | Doring |
| 2008/0041052 | A1 | 2/2008 | Doring et al. |
| 2008/0223021 | A1* | 9/2008 | Shaikh ................. F01N 3/2066 60/287 |
| 2010/0062296 | A1* | 3/2010 | Johannessen .......... B01D 53/02 429/515 |
| 2010/0107606 | A1 | 5/2010 | Narayanaswamy et al. |
| 2010/0209327 | A1 | 8/2010 | Soeger et al. |
| 2011/0120093 | A1 | 5/2011 | Eckhoff et al. |
| 2011/0123421 | A1 | 5/2011 | Grubert |
| 2011/0162350 | A1 | 7/2011 | Ponnathpur |
| 2011/0271664 | A1 | 11/2011 | Boorse et al. |
| 2012/0186229 | A1 | 7/2012 | Phillips et al. |
| 2013/0156668 | A1 | 6/2013 | Spurk et al. |
| 2013/0263927 | A1* | 10/2013 | Johannessen ........... F16K 49/00 137/1 |
| 2013/0327027 | A1* | 12/2013 | Bartolo ................. F01N 3/2066 60/295 |
| 2015/0139897 | A1 | 5/2015 | Bull et al. |

FOREIGN PATENT DOCUMENTS

| | | |
|---|---|---|
| EP | 0617199 A1 | 9/1994 |
| EP | 1054139 A1 | 11/2000 |
| EP | 1054722 B1 | 11/2000 |
| EP | 14862468 A1 | 12/2004 |
| EP | 1687514 A2 | 8/2006 |
| EP | 1876331 A2 | 1/2008 |
| EP | 1882832 A2 | 1/2008 |
| EP | 1892395 A1 | 2/2008 |
| EP | 1892396 A1 | 2/2008 |
| EP | 204034 B1 | 4/2009 |
| EP | 2105426 A1 | 8/2009 |
| EP | 2112339 A1 | 10/2009 |
| EP | 2117681 A4 | 11/2009 |
| EP | 2428659 A1 | 3/2012 |
| WO | 2004076829 A1 | 9/2004 |
| WO | 2005016497 A1 | 2/2005 |
| WO | 2005099873 A1 | 10/2005 |
| WO | 2008006427 A1 | 1/2008 |
| WO | 2009103549 A1 | 8/2009 |
| WO | 2010022909 A1 | 3/2010 |
| WO | 2011110919 A1 | 9/2011 |
| WO | 2011131324 A1 | 10/2011 |
| WO | 2012123660 A1 | 9/2012 |
| WO | 2012135871 A1 | 10/2012 |
| WO | 2012175409 A1 | 12/2012 |

OTHER PUBLICATIONS

Christian Hageluken. Autoabgaskatalysatoren. "Automobile Exhaust Gas Catalystic Converters" 2005. $2^{nd}$ edition, pp. 27-46.
W.M. Meier. Pure & Appl. Chem. "Zeolites and Zeolite-like Materials" vol. 58, No. 10, 1323-1328, 1986.
International Preliminary Report on Patentability dated Aug. 25, 2016 received in International application No. PCT/EP2014/053464, 17 pages (in German with English Translation).
Written Opinion of the International Searching Authority dated Aug. 25, 2016 reveived in International application No. PCT/EP2014/053464, 15 pages (in German with English Translation).

* cited by examiner

|  | SCR brick 1 | SCR brick 2 | SCR brick 3 |
|---|---|---|---|
| Technology (invention) WC1 system | WC1 | WC2 | WC2 |
| Technology (prior art) WC2 system | WC2 | WC2 | WC2 |

SCR CATALYTIC CONVERTER HAVING IMPROVED NOX CONVERSION

The present invention relates to the possibility of improving selective catalytic reduction (SCR), that is the selective reaction of nitrogen oxides with ammonia in the exhaust gas of combustion processes on an exhaust-gas catalytic converter suitable therefor—the SCR catalytic converter. For this purpose, materials used in the catalytic converter for storing ammonia are distributed on the catalyst carrier in a particular manner.

The exhaust gas of combustion processes, in particular that of diesel engines, but also that of direct-injection lean-mixture-operated gasoline engines, also contains particulate matter (PM) and nitrogen oxides (NOx) in addition to the harmful gases carbon monoxide (CO) and hydrocarbons (HC) resulting from incomplete combustion of the fuel. Furthermore, the exhaust gas of diesel engines contains, for example, up to 15 vol % oxygen. It is known that the oxidizable harmful gases CO and HC can be converted to harmless carbon dioxide ($CO_2$) and water ($H_2O$) by passing them over suitable oxidation catalytic converters and that particulates can be removed by passing the exhaust gas through a suitable particulate filter. Technologies for the removal of nitrogen oxides from exhaust gases in the presence of oxygen are also well known from the prior art. The SCR-method is one of these "denitrification methods." Here, ammonia as such or in the form of a precursor compound decomposable to ammonia in ambient conditions can be added to the exhaust gas stream, "ambient conditions" being understood to mean the current conditions in the spatial area of the exhaust gas stream upstream of the SCR catalytic converter. To perform the SCR method, a source for the provision of the reduction agent, an injection device for metering the reduction agent into the exhaust gas as required and an SCR catalytic converter arranged in the flow path of the exhaust gas are needed. The entirety of the reduction agent source, the SCR catalytic converter and the injection device arranged upstream of the SCR catalytic converter is also called an SCR system.

With the future applicable statutory limit values, an after-treatment of exhaust gases for the removal of all harmful gases emitted by the engine will generally be necessary for all newly registered diesel vehicles and direct-injection lean-mixture-combustion gasoline engines. Thus, it becomes necessary for the current applications for the after-treatment of diesel exhaust gases to combine diesel oxidation catalytic converters, diesel particulate filters and SCR systems, the combination of these aggregates bringing about changed operating conditions, especially for the SCR catalytic converter. At this time, three such systems are in testing: In the so-called "SCRT® system" according to EP1054722 B1, a diesel oxidation catalytic converter, a diesel particulate filter and an SCR system are arranged consecutively in the flow direction of the exhaust gas. Another modification of this system is shown in EP2112339 A1 (cDPF-DOC-SCR). Alternatively, the SCR system can be arranged between a diesel oxidation catalytic converter near the engine and a diesel particulate filter in the undercarriage of the vehicle (DOC-SCR-DPF; WO12123660 A1).

The cleaning efficiency of modern SCR systems for nitrogen oxides is more than 95% in optimal ranges. This is why the SCR method is currently seen as most promising cleaning method for the denitrification of diesel exhaust gases for applications in passenger cars and for the standard application in commercial vehicles. In particular with passenger cars, however, it must be observed that the temperatures of the exhaust gas to be cleaned that occur in the NEDC ("New European Driving Cycle") or WHTC (World Harmonized Transient Cycle) move into the colder range more and more. This means that an SCR catalytic converter installed in the undercarriage experiences less heat for the necessary reaction. The SCR reaction will only begin to a considerable extent at about 200-250° C. Furthermore, metering of urea as source for the reduction agent ammonia can only be made possible in a controlled manner at temperatures from 180° C. In order to not have to accept undesirable deposits of urea and reaction products in the exhaust system, this trend of the exhaust gas temperatures results in the SCR system no longer being able to be used effectively in the so-called "inner city part" (ECE) of the NEDC due to the prevailing low temperatures. Nitrogen oxide breakthroughs during the ECE and thus exceedance of the required NOx limit values in the total travel cycle of the NEDC are the result. The same also applies to the corresponding transient cycle of commercial vehicles, the WHTC. With the metering limits set by the metering hardware, particularly the cold part as well as the start of the warm part after the cut-off phase are a special challenge.

Possibilities therefore continue to be sought to increase the effectiveness of SCR catalytic converters in order to ensure optimum reduction of the nitrogen oxides across the widest temperature range possible. One strategy is to always find newer and more powerful materials that can catalyze the SCR reaction. It has been shown to be advantageous, for example, to use in addition to or as catalytically active material such a material that is capable of temporarily storing ammonia in order to balance out a selective surplus or a lack of sufficient ammonia for the reduction (WO05099873 A1). Moreover, special combinations of nitrogen oxide reduction catalytic converters, in particular nitrogen oxide storage catalytic converters and SCR catalytic converters (e.g. WO10022909 A1), come into consideration in order to be able to carry out the reduction to harmless nitrogen across a wider temperature range. An additional possibility is to use the SCR catalytic converters in stacked (e.g. EP2428659 A1) or zoned (e.g. EP2040834 A1) form.

In order to increase the effectiveness of catalytic converters, it has also been proposed to provide an anisotropic loading of the carder with catalytically active material (US20040254072 A1, US20110123421 A1, EP1486248 A1). With respect to SCR catalytic converters, US20120186229 A1 teaches that a higher concentration of catalytically active components should be applied at the inlet than at the outlet, EP1892396 B1 advocates an increase in the catalytically active species in the flow direction for SCR catalytic converters arranged in the outlet area of particulate filters for reasons of thermal insulation.

The present invention also concerns the further improvement of SCR catalytic converters. In doing so, the solution found should be superior to the catalytic converters of the prior art at least with respect to efficiency or, if the same efficiency, with respect to the cost factor.

These and other tasks arising for the person skilled in the art in an obvious manner from the prior art are solved by an SCR catalytic converter or an arrangement of SCR catalytic converters according to the characteristics of the present claim 1. Subclaims depending from claim 1 relate to preferred embodiments of the method according to the invention. Claims 5 and 6 relate to an exhaust gas cleaning system equipped with the catalytic converter according to the invention and claim 7 relates to a method performed with the SCR catalytic converters for minimizing nitrogen oxide.

Using an exhaust gas catalytic converter for the reduction of nitrogen oxides in the exhaust gas of lean-mixture-combustion engines by reaction with ammonia, which has one or more supporting bodies and comprises one or more storage materials for ammonia, in which a material with ammonia storage capacity is distributed on the supporting body/bodies in the flow direction of the exhaust gas in such a way that, when viewed in the flow direction, an area with lower ammonia storage capacity is followed by an area of higher ammonia storage capacity, wherein the material determining the catalytic activity for the reaction considered is made of a material which has ammonia storage capacity, and wherein as the latter compounds selected from the group comprising zeolites, such as mordenite (MOR), Y-zeolite (FAU), ZSM-5 (MFI), ferrierite (FER), chabazite (CHA), and β-zeolite (BEA) as well as zeolite-like materials, such as aluminum phosphate (AlPO) and silicon aluminum phosphate (SAPO) or mixtures thereof are used and wherein a particulate filter as a supporting body itself does not have an increase in the catalytically active material, results in a surprisingly simple, but not less advantageous solution of the given task. With the catalytic converter or catalytic converter system according to the invention, it is possible to save starting material costs with similar activity or ensure higher effectiveness of the catalytic converter or catalytic converter system with the same use of components.

Basically, the exhaust gas catalytic converter claimed here consists of one or more supporting bodies, on which or into which—e.g. into the porous wall structures—the catalytically active material (i.e. the material which in the end performs the catalytic function) and the storage material mentioned above (the material which provides the ammonia storage capacity) are introduced. It is clear to the person skilled in the art what the carriers may be in this case. What is referred to are so-called flow-through monoliths or particulate filters (Christian Hagelüken, "Autoabgaskatalysatoren" ["Automobile exhaust gas catalytic converters"], 2005, 2nd edition, pp. 27-46). Such aggregates (filters as well as flow-through monoliths)—even with an SCR-active coating—are sufficiently known to the person skilled in the art (e.g. US2011271664 AA).

Common filter bodies known in the prior art can be made of metal and/or ceramic materials. These include for example metal fabric and mesh filter bodies, sintered metal bodies and foam structures from ceramic materials. Preferably, porous wall-flow filter substrates from cordierite, silicon carbide or aluminum titanate are used. These wall-flow filter substrates have inlet and outlet channels, the outlet ends of the inlet channels and the inlet ends of the outlet channels respectively being offset from each other are sealed with a gas-tight "plug." Here, the exhaust gas that is to be cleaned and flows through the filter substrate is forced to pass through the porous wall between inlet and outlet channel, which induces an excellent particulate filter effect. The filtration characteristic for the particulates can be designed by means of porosity, pore/radii distribution and thickness of the wall. The storage materials for ammonia as well as the catalytically active material can be present in form of coatings in and/or on the porous walls between the inlet and outlet channels. Filters that were extruded from the respective storage and catalytic converter materials directly or using binders can also be used, i.e. the porous walls are made directly from the catalytic converter material and the storage material. Preferably used filter substrates can be taken from WO2005016497A1 or EP2117681A.

With regard to the particulate filters used as supporting bodies, it should be mentioned that these should be designed according to the claim in such a way that there is no increase of the catalytically active material, i.e. the material which catalyzes the actual SCR reaction, on a particulate filter. This means that there is, in each volume element of the particulate filter along the flow direction, a concentration of catalytically active material that does not increase within the framework of manufacturing precision. Preferably, the catalytically active material is present on the particulate filter, evenly distributed when viewed in the flow direction. Since, according to the invention, the catalytically active material can also provide the ammonia storage capacity, the latter is in this case also present on the particulate filter, evenly distributed in the flow direction. According to the claim, a respectively designed particulate filter is therefore in this case always associated with at least one additional supporting body which, according to the claim, has a different ammonia storage capacity than the particulate filter.

In the prior art, flow-through monoliths are common catalytic converter carriers that can consist of metal or ceramic materials. Preferably, fire-proof ceramics, such as cordierite, are used. The monoliths made from ceramics mostly have a honeycomb structure that consists of continuous channels, which is why they are also referred to as channel flow monoliths. The exhaust gas can flow through the channels and, in doing so, comes in contact with the channel walls which are provided with a catalytically active substance and a storage material. The number of channels per area is characterized by the cell density, which is usually between 300 and 900 cells per square inch (cpsi). The wall thickness of the channel walls in ceramics is between 0.5-0.05 mm. There is the option of manufacturing the flow-through monoliths from the catalytically active material itself.

Preferably, the exhaust gas catalytic converter according to the invention has one or more supporting bodies which consist of one or more storage materials for ammonia and in which a material with ammonia storage capacity is distributed on the supporting body/bodies in the flow direction of the exhaust gas in such a way that, with respect to the exhaust gas catalytic converter, there is less ammonia storage capacity at the inlet end than at the outlet end. It should be noted that the exhaust gas catalytic converter used here can either consist of a supporting body or multiple individual supporting bodies preferably arranged directly one behind the other in the flow direction. Here, the supporting body is prepared in such a way that the storage material is located on or in the carrier or supporting body. Here, the material with ammonia storage capacity is to be distributed on or in the carrier or supporting bodies so that, when viewed in the flow direction, an area with lower ammonia storage capacity and catalytic activity is followed by an area of higher ammonia storage capacity. Preferably, the arrangement is such that, in the flow direction of the exhaust gas, there is less storage capacity for ammonia on the inlet end than on the outlet end of the exhaust gas catalytic converter.

Particularly preferred is the ratio of ammonia storage capacity of an area with lower ammonia storage capacity to an area of higher ammonia storage capacity, or the preferred relationship of storage capacity present on the inlet side to storage capacity present on the outlet side, of 30-70%. Advantageous are differences of 35-65% and especially advantageous are differences of 40-60% in this respect. The total storage capacity of the ammonia storage components used should be between 0.25 and 3.5 g $NH_3$ per liter catalytic converter volume, preferably between 0.5 and 2.2 g $NH_3$ per liter catalytic converter volume, and particularly preferably between 0.5 and 2.0 g $NH_3$/liter catalytic converter volume.

In consideration of the relationships specified above with respect to the ammonia storage capacity, an area of lower storage capacity is thereby characterized by a capacity of 0.1 g $NH_3$/liter catalytic converter volume—2.5 g $NH_3$/liter catalytic converter volume, preferably 0.2 g $NH_3$/liter catalytic converter volume—1.45 g $NH_3$/liter catalytic converter volume, and particularly preferably 0.25 g $NH_3$/liter catalytic converter volume—1.2 g $NH_3$ per liter catalytic converter volume. An area of increased ammonia storage capacity is thereby characterized by a capacity of 0.2 g $NH_3$/liter catalytic converter volume—3.5 g $NH_3$/liter catalytic converter volume, preferably 0.4 g $NH_3$/liter catalytic converter volume—2.2 g $NH_3$/liter catalytic converter volume, and particularly preferably 0.5 g $NH_3$/liter catalytic converter volume—2 g $NH_3$/liter catalytic converter volume. Advantageous areas in the sense of the present invention are sections of the exhaust gas catalytic converter in the flow direction with a relative length of 10-50%, preferably 15-45%, and particularly preferably 20-40% of the entire length of the exhaust gas catalytic converter. The end of the exhaust gas catalytic converter on the inlet side or outlet side is generally an area of 10-50%, preferably 15-45%, and particularly preferably 20-40% of the entire length of the exhaust gas catalytic converter, calculated from the inlet or calculated from the outlet.

In doing so, a continuous increase of the storage capacity can result over certain areas, preferably over the length of the exhaust gas catalytic converter, or zones with respectively higher capacity from one area to the other are arranged, preferably from the inlet to the outlet of the exhaust gas catalytic converter. An increased storage capacity for ammonia can thereby also be achieved by additional coatings being arranged on top of one another or by using different storage materials (see for example FIG. 6). Within the framework of the present invention, in case of an exhaust gas catalytic converter consisting of multiple carriers, at least one supporting body succeeding in the flow direction of the exhaust gas can advantageously have more ammonia storage capacity than the previous one. The number of supporting bodies of which the exhaust gas catalytic converter consists is preferably 1-4, particularly preferably 1-3, and most particularly preferably 2 or 3.

The exhaust gas catalytic converter for the reduction of nitrogen oxides by reaction with ammonia has, according to the invention, one or more storage materials for ammonia, these storage materials being distributed if need be according to storage capacity as described above on the carrier or the supporting bodies. According to the invention, the material which determines the catalytic activity for the reaction considered is already made of a material which has the ability to store ammonia, such as zeolite. In this case, less additional storage material for ammonia can be used since the existing catalytically active material already comes with the required ammonia storage capacity. In the extreme case, even additional ammonia storage material in excess of the existing catalytically active material can be dispensed with if the existing storage capacity of the catalytically active material is deemed to be sufficient within the framework of the invention (see below).

Materials which have been shown to be advantageous for the application of storing $NH_3$ are known to the person skilled in the art (US2006/0010857 AA; WO2004076829 A1). In particular microporous solid materials, such as so-called molecular sieves, are used as storage materials. As ammonia storage materials, such compounds selected from the group comprising zeolites, such as mordenite (MOR), Y-zeolite (FAU), ZSM-5 (MFI), ferrierite (FER), chabazite (CHA), and β-zeolite (BEA) as well as zeolite-like materials, such as aluminum phosphate (AlPO) and silicon aluminum phosphate (SAPO) or mixtures thereof are used (EP0324082 A1). ZSM-5 (MFI), chabazite (CHA), ferrierite (FER), SAPO-34 and β-zeolite (BEA) are particularly preferably used. Especially preferably used are CHA, BEA and AlPO-34 or SAPO-34. Extremely preferably used are materials of the CHA type, and here most preferably SAPO-34.

Catalytically active material is commonly understood to be the "washcoat" with which the carrier is provide. However, the latter can, besides the catalytically active component in the strict sense, also contain additional materials, such as binders from transition metal oxides, high surface area carrier oxides, such as titanium oxide, zirconium oxide, aluminum oxide, in particular gamma-$Al_2O_3$, or cerium oxide. However, the catalytically active material used according to the invention preferably has compounds from the group of transition metal-exchanged zeolite or zeolite-like materials. Such compounds are sufficiently known to the person skilled in the art (EP324082 A1). The zeolites or zeolite-like materials used can be the same as those that provide the ammonia storage in the exhaust gas catalytic converter. In this respect, materials from the group comprising chabazite, SAPO-34, ALPO-34, zeolite β and ZSM-5 are preferred. Zeolites or zeolite-like materials from the chabazite type, particularly SAPO-34, are particularly preferably used. These materials are preferentially provided with transition metals from the group comprising iron, copper, manganese and silver in order to ensure sufficient activity. It should be mentioned that copper is especially advantageous in this respect. The person skilled in the art knows in this regard how to provide the zeolites or zeolite-like materials with transition metals (PCT/EP2012/061382 and the literature cited there) in order to be able to provide good activity against the reduction of nitrogen oxides with ammonia.

For exhaust after-treatment systems, which have a nitrogen oxide storage catalytic converter followed by an exhaust gas catalytic converter according to the invention—which constitutes a preferred system according to the invention—among others, it has been shown to be advantageous to design the SCR exhaust gas catalytic converter in such a way that it has the possibility of storing a sufficient amount of ammonia ($NH_3$). The interconnection of such exhaust after-treatment aggregates was described in EP1687514 A1, for example. In these systems, it is an advantage that the nitrogen oxide storage catalytic converter also slightly produces ammonia in the regeneration phase. If the downstream SCR exhaust gas catalytic converter has an $NH_3$ storage, the $NH_3$ produced in this way can be stored in it and would be available for the subsequent reduction of the $NO_x$ broken down by the preceding nitrogen storage catalytic converter. In such systems, the SCR exhaust gas catalytic converter designed according to the invention is particularly preferably usable.

Generally, an SCR catalytic converter is particularly active if its ammonia storage is at least partially filled. The metering of ammonia in the exhaust gas system mostly occurs by means of an external metering unit directly into the exhaust gas system in front of the SCR catalytic converter. A slip of ammonia as a result of an over-metering or an ammonia desorption as a result of a quick temperature increase should be avoided in an advantageous manner since ammonia has a strong acrid smell and should not reach the atmosphere as a secondary or tertiary emission in an untreated condition. Due to the high dynamics of the operating conditions of an engine, it is nevertheless difficult to meter the ammonia in such a way that there is always enough ammonia available for the reduction of NOx, but that on the other hand all the added ammonia is used up as far as possible. Here, the ammonia storage material used produces a certain buffer. It is however also advantageous if there is an ammonia oxidation catalytic converter (AMOX) on the outlet end of the exhaust gas catalytic converter according to the invention. There, excess ammonia is oxidized into harmless nitrogen. The AMOX catalytic converter can be arranged as a separate unit behind the exhaust gas catalytic converter. It is, however, advantageous if an ammonia oxidation catalytic converter (AMOX) is located at, on or under its outlet end. Corresponding catalytic converters are known to the person skilled in the art (U.S. Pat. No. 5,120,695; EP1892395 A1; EP1882832 A2; EP1878331 A2; WO12135871 A1; US2011271664 AA; WO11110919 A1).

The object of the present invention is also an exhaust gas system having the exhaust gas catalytic converter according to the present invention and additional devices selected from the group comprising one or more oxidation catalytic converters for the oxidation of HO and CO, a nitrogen oxide storage catalytic converter, a possibly catalytically coated particulate filter for collecting the carbon-particulate matter and an injection device for ammonia or an ammonia precursor compound. Oxidation catalytic converters, particulate filters and nitrogen storage catalytic converters are familiar to the person skilled in the art. It is advantageous if another catalytic converter for the oxidation of ammonia to nitrogen is installed or positioned as described above on the outlet side of this system in order to minimize the ammonia slip already mentioned.

The object of the present invention is also a corresponding method in which exhaust gas is guided across the exhaust gas catalytic converter in the presence of ammonia under operating conditions. It goes without saying that the preferred embodiments mentioned for the exhaust gas catalytic converter mentioned above also apply mutatis mutandis to the system and the method mentioned here.

The term "zeolite" refers to porous materials with a lattice structure of corner-connected $AlO_4$ and $SiO_4$ tetrahedrons according to the general formula (W. M. Meier, *Pure & Appl. Chem.*, vol. 58, no. 10, pp. 1323-1328, 1986):

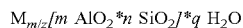

$M_{m/z}[m\ AlO_2 * n\ SiO_2]*q\ H_2O$

Thus, the structure of a zeolite consists of a grid that is made of tetrahedrons and surrounds channels and cavities. One distinguishes naturally occurring and synthetically produced zeolites.

Within the scope of this document, the term "zeolite-like compound" refers to a compound that has the same structural type as a naturally occurring or synthetically produced zeolite compound, but which differs from them in that the corresponding cage structure is not made exclusively from aluminum and silicon structure atoms. In such compounds, the aluminum and/or silicon structure atoms are replaced by other trivalent, tetravalent or pentavalent structure atoms, such as B(III), Ga(III), Ge(IV), Ti(IV) or P(V). In practice, the replacement of aluminum and/or silicon structure atoms with phosphorous atoms, such as in silicon aluminum phosphates or in aluminum phosphates that crystallize in zeolite structure types is most often used. Prominent examples are the silicon aluminum phosphate SAPO-34 crystallized in chabazite structure and the aluminum phosphate AlPO-34 crystallized in chabazite structure.

FIGURES

Figure 1:
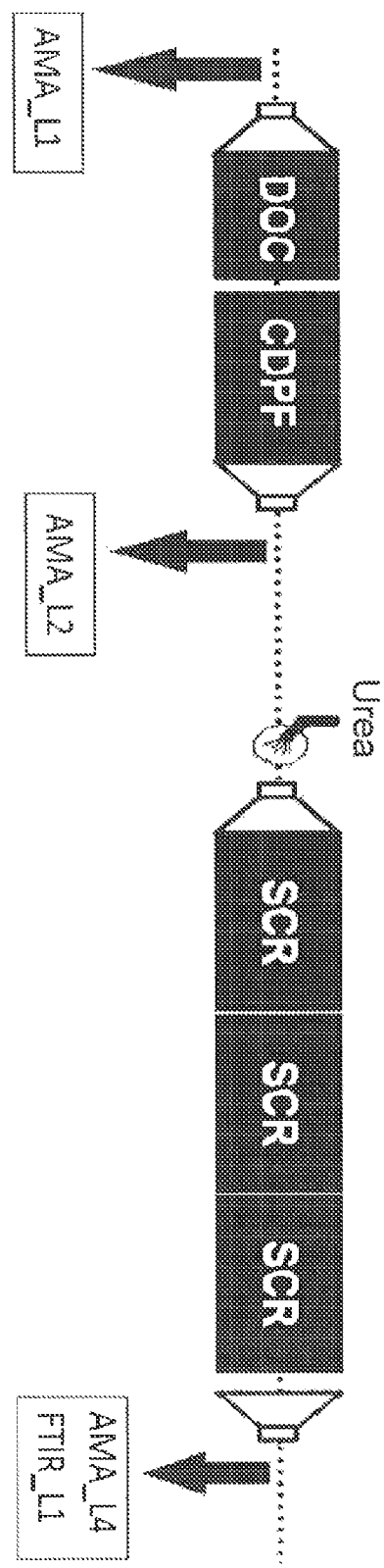
FIG. 1 shows an exemplary exhaust gas cleaning system according to the invention.

FIG. 1: FIG. 1 shows an exemplary exhaust gas cleaning system according to the invention together with the necessary analytical sampling locations for performance of the experimental part. The system consists of an oxidation catalytic converter, followed by a catalytically coated particulate filter, a unit for the addition of urea and an SCR catalytic converter comprising three carriers.

Figures 2, 3:
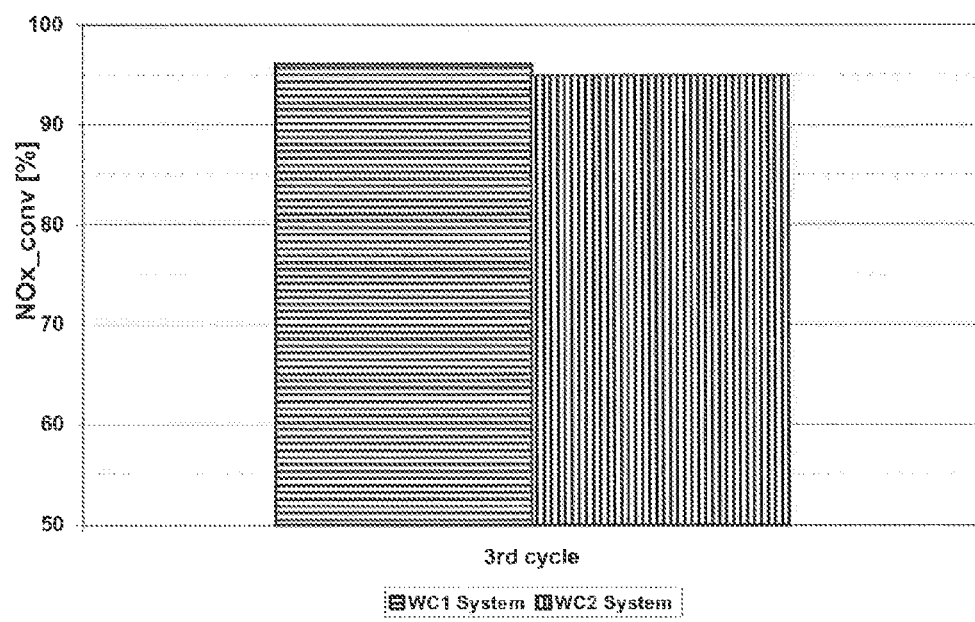
FIG. 2 relates to two different embodiments of the SCR catalytic converter used.
FIG. 3 shows the results that can be achieved with the two alternative systems of FIG. 2.

FIG. 2: FIG. 2 relates to two different embodiments of the SCR catalytic converter used. In case 1, the front carrier—designated WC1—has a washcoat loading reduced by 60 wt.-% and thus a correspondingly reduced ammonia storage capacity in comparison to the second and third carrier (WC2). In the lower case, all carriers are constructed equally. Here, the catalytically active material also provides the entire ammonia storage capability.

FIG. 3: FIG. 3 shows the results that can be achieved with the two alternative systems of FIG. 2. Here, it is apparent that the system according to the invention having the carrier WC1 has a higher total NOx conversion than the reference system characterized by carriers having WC2 exclusively. Depicted here are the NOx conversions in the third warm WHTC of a series of successive warm cycles.

Figure 4:
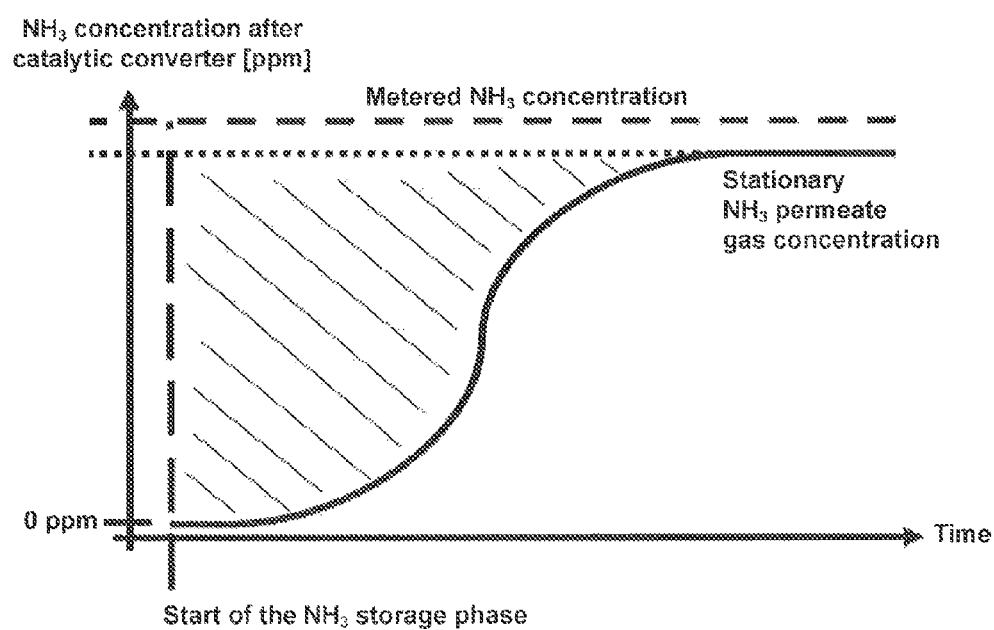
FIG. 4 shows ammonia storage capacity characteristics of this invention.

FIG. 4: The ammonia storage capacity mentioned within the scope of this invention is specified as a quotient of stored mass of ammonia per liter of catalytic converter volume. It is determined experimentally in a stream pipe reactor. In order to avoid undesirable ammonia oxidation on the reactor material, a reactor made of quartz glass is used. A drill core is drawn as a test object from the area of the catalytic converter whose ammonia storage capacity is to be determined. Preferably, a drill core having a 1 inch diameter and a 3 inch length is drawn as a specimen. The drill core is placed in the stream pipe reactor and conditioned for 10 minutes at a temperature of 600° C. in a gas atmosphere of 500 ppm nitrogen monoxide, 5 vol % oxygen, 5 vol % water and the rest nitrogen with a space velocity of 30000 $h^{-1}$. Subsequently, the measurement temperature of 200° C. is approached in a gas mixture of 5 vol % oxygen, 5 vol % water and the rest nitrogen with a space velocity of 30000 $h^{-1}$. After the temperature is stabilized, the $NH_3$ storage phase is initiated by adding a gas mixture of 450 ppm ammonia, 5 vol % oxygen, 5 vol % water and the rest nitrogen with a space velocity of 30000 $h^{-1}$. This gas mixture is added until a stationary ammonia permeate gas concentration is recorded on the outlet side of the specimen. The $NH_3$ concentration measured at the stationary phase after the catalytic converter can also be below the $NH_3$ concentration metered due to ammonia oxidation at the specimen. The mass of ammonia stored on the specimen is calculated by integration from the ammonia breakthrough curve recorded from the start of the $NH_3$ storage phase until the stationary phase is reached, with the inclusion of the measured stationary $NH_3$ breakthrough concentration and the known volume flow (shaded area in the figure). The ammonia storage capacity is calculated as a quotient of the mass of ammonia stored divided by the volume of the tested drill core.

EXAMPLES

The measurement of the system according to the invention occurred on a commercial vehicle engine with 13 L, cubic capacity. The entire exhaust after-treatment system consisted of a DOC, a downstream DPF and the SCR system, having 3 successive catalytic converter components (Brick 1 through Brick 3). In both cases analyzed, the DOC+DPF preliminary system was left unchanged. As reduction agent, an aqueous urea solution (trade name AdBlue®) was injected in the flow direction in front of the exhaust gas catalytic converter. For this purpose, a commercially available injection nozzle was used. The amount of the injected reduction agent was selected such that 30% excess supply of reduction agent relative to the NOx emissions of the engine that are present at the inlet of the SCR system was available at all times.

In the case of the system described in FIG. 2, the test series run consisted of 5 successive WHTC cycles. Here the entire cycle, consisting of a cold and a warm part, was not run, but only the warm part after 10 minutes of idling in each case. The test series was started with one exhaust gas catalytic converter each, the ammonia storage of which was completely empty to begin with.

During the cycles, the NOx emissions on the inlet and outlet side of the SCR system were measured and integrated and then related to the work done during the cycle. The conversion was determined for both tested system variants as difference of specific emissions relative to specific inlet emission.

The invention claimed is:

1. A method for the reduction of nitrogen oxides in the exhaust gas of a combustion process of lean-mixture-combustion engines by reaction with ammonia across an exhaust gas catalytic converter, the exhaust gas being guided across an exhaust gas catalytic converter in the presence of ammonia and the exhaust gas catalytic converter having one or several supporting bodies comprising one or several storage materials for ammonia, in which a material with ammonia storage capacity is distributed on the supporting body/bodies in such a way that, when viewed in the flow direction, an area with lower ammonia storage capacity is followed by an area of higher ammonia storage capacity, wherein the material determining the catalytic activity of the contemplated reaction is made of a material which has ammonia storage capacity and, as the latter, compounds selected from the group comprising zeolites, zeolite-like materials, or mixtures thereof are used, wherein a particulate filter as a supporting body in itself is not to have an increase in the catalytically active material.

2. The method according to claim 1, wherein the area of lower ammonia storage capacity has only 30-70% of the ammonia storage capacity of the area of higher ammonia storage capacity.

3. The method according to claim 1 wherein zeolite or zeolite-like materials selected from the group comprising chabazite, SAPO-34, ALPO-4 and Zeolite β are used as storage material for ammonia.

4. The method according to claim 1 wherein at, on or under its outlet end, there is an ammonia oxidation catalytic converter.

5. The method according to claim 2, wherein zeolite or zeolite-like materials selected from the group comprising chabazite, SAPO-34, ALPO-4 and Zeolite β are used as storage material for ammonia.

6. The method according to claim 5, wherein at, on or under its outlet end, there is an ammonia oxidation catalytic converter.

7. The method according to claim 2, wherein at, on or under its outlet end, there is an ammonia oxidation catalytic converter.

8. The method according to claim 3, wherein at, on or under its outlet end, there is an ammonia oxidation catalytic converter.

9. The method according to claim 1, wherein the storage material for ammonia comprises a zeolite-like material that is SAPO-34, ALPO-4 or both.

10. The method according to claim 1, wherein the storage material for ammonia comprises a zeolite that is chabazite, Zeolite β, or both.

11. The method according to claim 1, wherein the storage material for ammonia comprises a zeolite that is mordenite (MOR), Y-zeolite (FAU), ZSM-5 (MFI), ferrierite (FER), chabazite (CHA), β-zeolite (BEA) or a mixture of two or more thereof.

12. The method according to claim 1, wherein the storage material for ammonia comprises a zeolite-like material that is aluminum phosphate (AlPO), silicon aluminum phosphate (SAPO) or a mixture thereof.

13. The method according to claim 12, wherein the storage material for ammonia is SAPO-34, ALPO-4 or a mixture thereof.

14. The method according to claim 1, wherein the storage material for ammonia is a), b) or a mixture of a) and b) with:
  a) being mordenite (MOR), Y-zeolite (EAU), ZSM-5 (MFI), ferrierite (FER), chabazite (CHA), β-zeolite (BEA) or a mixture of two or more thereof; and
  b) being aluminum phosphate (AlPO), silicon aluminum phosphate (SAPO) or a mixture thereof.

15. The method according to claim 14, wherein the storage material for ammonia includes a).

16. The method of claim 15 wherein a) is one of chabazite, Zeolite β, or a mixture thereof.

17. The method according to claim 14, wherein the storage material for ammonia includes h).

18. The method of claim 14 wherein at least one storage material is provided with a transition material that is iron, copper, manganese, silver or a mixture of any two or more thereof.

19. The method of claim 1 wherein at least one storage material is provided with a transition material that is iron, copper, manganese, silver or a mixture of any two or more thereof.

20. The method of claim 1 wherein the exhaust is passed over or through each of a diesel oxidation catalyst, the particulate filter, and one or more SCR catalysts.

* * * * *